P. DAIMLER.
DOUBLE FRICTION CLUTCH.
APPLICATION FILED JULY 7, 1910.

996,318.

Patented June 27, 1911.

2 SHEETS—SHEET 2.

Witnesses:
Corinne Myers.
Thomas Donnellan.

Inventor:
Paul Daimler.
by Z. K. Böhm
Attorney

UNITED STATES PATENT OFFICE.

PAUL DAIMLER, OF UNTERTÜRKHEIM-STUTTGART, GERMANY.

DOUBLE FRICTION-CLUTCH.

996,318.  Specification of Letters Patent.  Patented June 27, 1911.

Application filed July 7, 1910. Serial No. 570,706.

*To all whom it may concern:*

Be it known that I, PAUL DAIMLER, a subject of the King of Würtemberg, and resident of Untertürkheim-Stuttgart, in the Kingdom of Würtemberg, German Empire, have invented a certain new and useful Double Friction-Clutch, of which the following is a specification.

This invention relates to improvements in double friction clutches of the type in which the coupling is moved out of gear against the influence of a spring tending to force the coupling into frictional engagement.

The principal object of this invention is to provide a strong construction of a coupling of this type in which ready access is afforded to the devices for disengaging the coupling.

Figure 1:
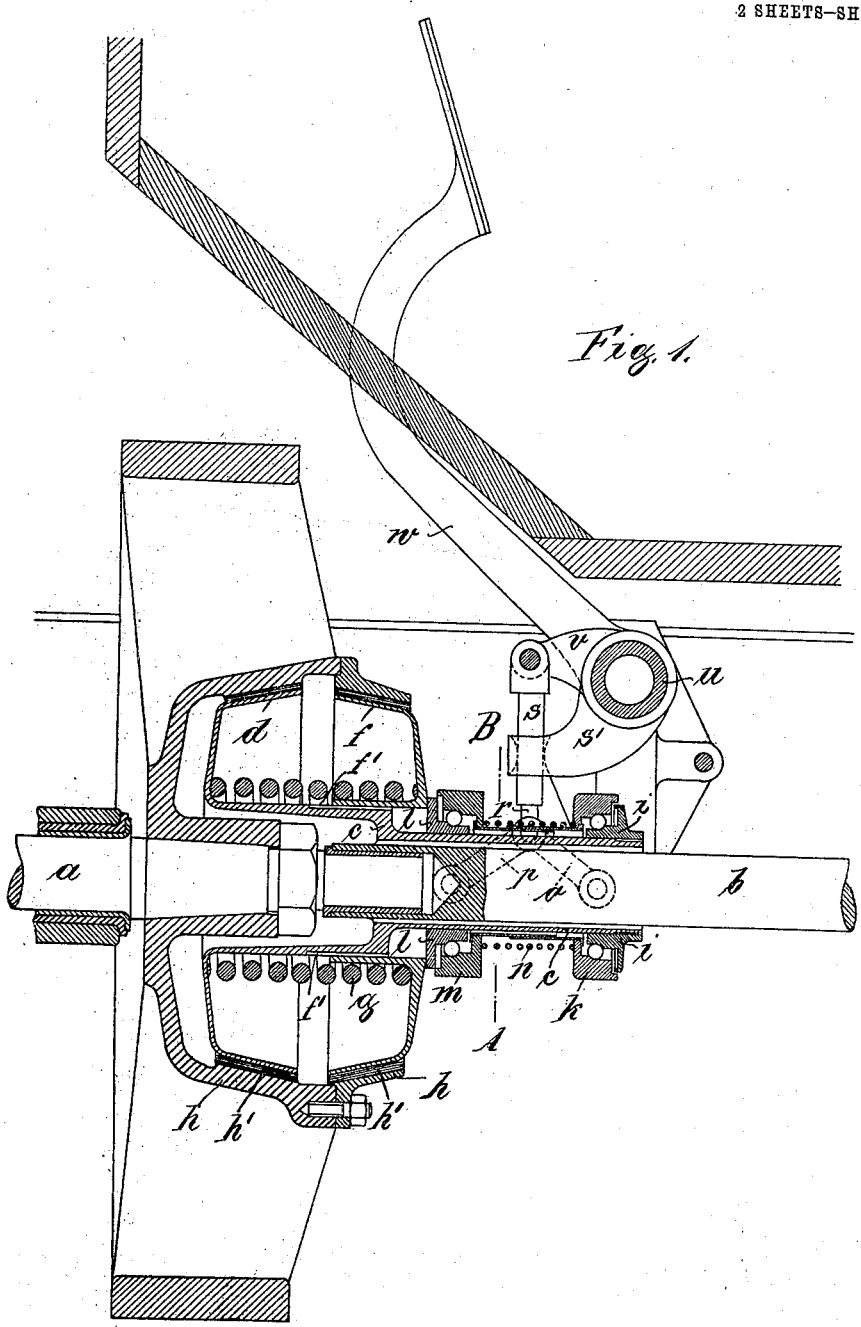
Figure 2:
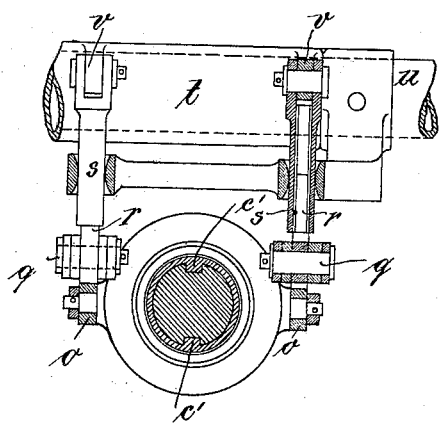
Figure 3:
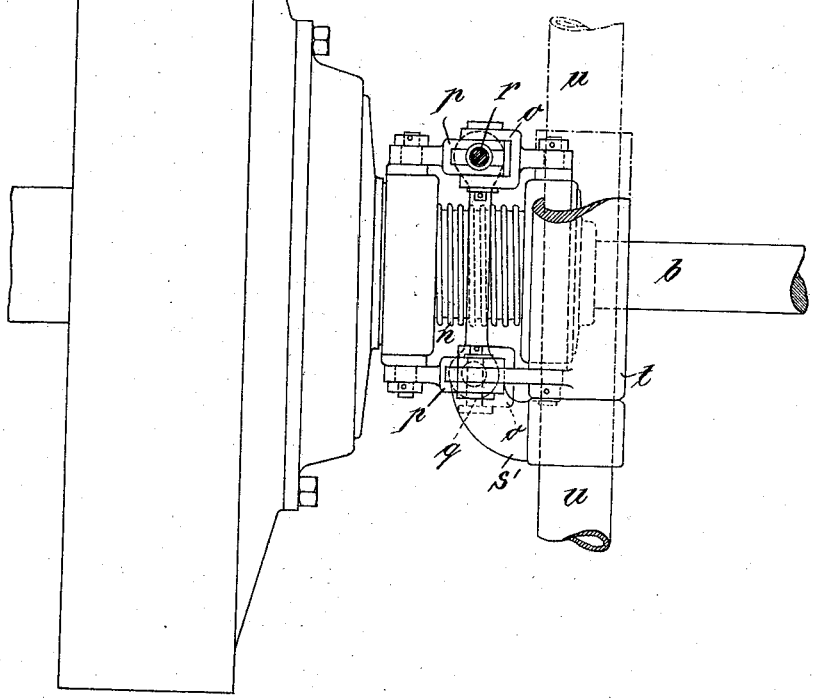

This invention is illustrated in the accompanying drawings as applied to a double-coned coupling, Figure 1 being a longitudinal section partly in elevation, Fig. 2 a cross section upon the line A—B of Fig. 1, and Fig. 3 a plan view.

A motor shaft $a$ is shown axially alined with a driven shaft $b$ and a sleeve $c$ is axially screwed to the shaft $b$, this sleeve being prevented by feathers $c'$ from rotating on the shaft $b$. A friction cone $d$ is fixed to or formed on the sleeve $c$ which also supports a second friction cone $f$, the latter being axially movable but prevented from rotating on the sleeve by feathers $f'$. The two friction-cones are pressed asunder by a spring $g$ so that they bear against corresponding friction surfaces $h'$ $h'$ on a divided enlarged hub $h$ of a fly wheel.

A ring $i$ is securely seated on the end of the sleeve $c$ exteriorly of the fly-wheel hub $h$. This ring $i$ is formed as a ball-race and a ring $k$ constitutes the counter ball-race and serves to displace the clutch part $d$. Outside of the friction cone $f$ is seated loosely on the sleeve $c$ a ring $l$, formed as a ball race, with a corresponding ring $m$ serving for displacement of the clutch part $f$. The two rings $m$ and $k$ are pressed apart by a spring $n$ so that they bear against the balls situated between them and the rings $l$ and $i$; the ring $l$ resting against the friction cone $f$. The two arms $o$ and $p$ of a toggle, the knee-joints $q$ of which are connected with push-rods $r$, are pivotally connected with rings $k$ and $m$. The push rods $r$, are screwed in vertical guiding sockets $s$ which are carried in fixed bearings $s'$ supported on the fixed foot lever part $u$. The upper ends of the sockets $s$ are jointedly connected with arms $v$ on a sleeve $t$ connected to the foot lever $w$ and rotating on the foot-lever-shaft $u$.

If it is desired to disengage the coupling the push rods $r$ are pressed down by pressing down the foot lever $w$ and therefore the arms $v$ fixed on the foot lever shaft. By this means the two arms $o$ and $p$ of the toggle are spread and the rings $k$ and $m$ act, through the balls, on the rings $i$ and $l$, so that the ring $i$ is moved to the right and the ring $l$ to the left. The ring $i$ being securely connected with the sleeve $c$ moves the latter and therefore the friction cone $d$ to the right, while the ring $l$, which bears direct against the friction cone $f$, moves the latter to the left. By this means the two friction cones are simultaneously moved to the same extent from their respective friction surfaces $h'$ $h'$ on the enlarged fly wheel hub $h$ and the coupling is thus disengaged. A uniform movement of the two friction cones from the corresponding friction surfaces is obtained by reason of the fact that the joints $q$ of the toggles cannot yield to one side or the other in consequence of the fixed guide $s'$. Upon the release of the foot lever the two friction cones $d$ and $f$, through the pressure of the spring $g$, return into the clutching position.

I claim:—

1. A double friction coupling, comprising a shaft, a friction element provided with two oppositely arranged friction faces and keyed on said shaft, a second shaft, a second friction-element mounted on and rotating with said second shaft while capable of sliding axially into engagement with a face on the first mentioned friction element, a third friction element mounted on and rotating with said second friction element while capable of sliding axially into engagement with the other face on the first mentioned friction element, elastic means for normally holding said second and third mentioned friction elements in engagement with the faces on the first mentioned element, and externally operated toggle levers connected to and outside said elements for moving said second and third mentioned elements uniformly in opposite directions against the influence of said elastic means so as to disengage said elements.

2. A double friction coupling, comprising a shaft, a friction element provided with two oppositely arranged friction faces and keyed on said shaft, a second shaft, a second friction element provided with a sleeve, mounted on and rotating with said second shaft while capable of sliding axially into engagement with a face on the first mentioned friction element, a third friction element mounted on said sleeve and rotating with said second friction element while capable of sliding axially into engagement with the other face on the first mentioned friction element, elastic means for normally holding said second and third mentioned friction elements in engagement with the faces on the first mentioned element, toggle levers arranged outside said elements, a rod movable at right angles to said second shaft for operating the knee-joint of said toggle levers, means for communicating the motion of the other ends of said levers to the second and third mentioned elements respectively against the influence of said elastic means, and a pivoted lever for operating said rod.

3. A double friction coupling comprising a shaft, a friction element provided with two oppositely arranged friction faces and keyed on said shaft, a second shaft, a second friction element provided with a sleeve mounted on and rotating with said second shaft while capable of sliding axially into engagement with a face on the first mentioned friction element, a third friction element mounted on said sleeve and rotating with said second friction element while capable of sliding axially into engagement with the other face on the first mentioned friction element, a spring for normally holding said second and third mentioned friction elements in engagement with the faces on the first mentioned element, a collar on the outer end of said sleeve, a loose collar mounted on said sleeve between the first named collar and the third mentioned friction element, a pair of rings located between said collars, a pair of trunnions on each of said rings, anti-friction devices between said rings and said collars, a pair of toggle levers on each side of said rings pivoted at one end on said trunnions, rods movable at right angles to said second shaft for operating the knee-joint of each pair of levers, a pivoted lever and means operated by said lever for uniformly operating each rod.

4. A double friction coupling, comprising a driving shaft and a driven shaft, a fly wheel keyed on said driving shaft, an oppositely coned divided friction element on said fly wheel, a second friction element provided with a sleeve mounted on and rotating with said driven shaft while capable of sliding axially into engagement with one of the cone faces on said divided friction element, a third friction element mounted on said sleeve and rotating therewith while capable of sliding axially into engagement with the other cone face on the said divided friction element, a spring for normally holding said second and third mentioned friction elements in engagement with the cone faces on said divided element and a toggle lever mechanism arranged outside said element and adapted to move said second and third mentioned friction elements uniformly out of engagement with said divided friction element.

In witness whereof I have hereunto set my hand in the presence of two witnesses.

PAUL DAIMLER.

Witnesses:
ERNST MOCROCS,
FRANZ LINCK.